US010374796B2

(12) United States Patent
Oshida et al.

(10) Patent No.: US 10,374,796 B2
(45) Date of Patent: Aug. 6, 2019

(54) COMMUNICATION SYSTEM, COMMUNICATION DEVICE, VEHICLE AND COMMUNICATION METHOD

(71) Applicant: Renesas Electronics Corporation, Tokyo (JP)

(72) Inventors: Daisuke Oshida, Tokyo (JP); Yoshiyuki Sato, Tokyo (JP); Yasuhiro Sagesaka, Tokyo (JP); Takeshi Itome, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 75 days.

(21) Appl. No.: 14/836,787

(22) Filed: Aug. 26, 2015

(65) Prior Publication Data

US 2016/0065367 A1 Mar. 3, 2016

(30) Foreign Application Priority Data

Aug. 28, 2014 (JP) .................................. 2014-173790

(51) Int. Cl.
*H04L 29/06* (2006.01)
*H04L 9/08* (2006.01)
(Continued)

(52) U.S. Cl.
CPC .......... *H04L 9/0869* (2013.01); *H04B 1/3822* (2013.01); *H04B 1/3827* (2013.01);
(Continued)

(58) Field of Classification Search
CPC ............... H04L 9/0869; H04L 61/6004; H04L 61/2007; H04L 63/0876; H04L 63/0869;
(Continued)

(56) References Cited

U.S. PATENT DOCUMENTS 6,101,499 A * 8/2000 Ford ................. H04L 29/12216
6,236,652 B1 * 5/2001 Preston ................. G01S 5/0027
370/349
(Continued)

FOREIGN PATENT DOCUMENTS

JP 2000-156682 A 6/2000
JP 2002-176444 A 6/2002
(Continued)

OTHER PUBLICATIONS

Vandenberghe et al., VANET addressing scheme incorporating geographical information in standard IPv6 header, IBBT, Jan. 2010.*
(Continued)

*Primary Examiner* — David Garcia Cervetti
(74) *Attorney, Agent, or Firm* — McGinn IP Law Group, PLLC (57) ABSTRACT

Provided is a high-speed and light-weighted authentication system that makes IP address filtering possible and does not impair real-time property even on a network including many and unspecific entities (communication devices). In a communication system that a plurality of communication devices are coupled together such that mutual communication is possible over the network, the communication devices communicate with a server under a secure environment, when authentication has been obtained from the server, random seeds of the same value and individual identifiers are issued to them, each communication device generates the IP address that includes a pseudorandom number and the identifier, and the communication devices establish communication between the communication devices that include the pseudorandom numbers that are mutually the same in their IP addresses.

19 Claims, 9 Drawing Sheets

(51) Int. Cl.

| | | |
|---|---|---|
| *H04L 29/12* | (2006.01) | |
| *H04W 12/06* | (2009.01) | |
| *H04W 4/02* | (2018.01) | |
| *H04B 1/3827* | (2015.01) | |
| *H04B 1/3822* | (2015.01) | |
| *H04L 29/08* | (2006.01) | |
| *G08G 1/0967* | (2006.01) | |
| *G08G 1/16* | (2006.01) | |

(52) U.S. Cl.
CPC ...... *H04L 61/2007* (2013.01); *H04L 61/2092* (2013.01); *H04L 61/6004* (2013.01); *H04L 61/6068* (2013.01); *H04L 63/0869* (2013.01); *H04L 63/0892* (2013.01); *H04L 63/107* (2013.01); *H04W 4/025* (2013.01); *H04W 12/06* (2013.01); *G08G 1/096783* (2013.01); *G08G 1/096791* (2013.01); *G08G 1/162* (2013.01); *H04L 61/2053* (2013.01); *H04L 67/12* (2013.01)

(58) Field of Classification Search
CPC . H04L 63/164; H04L 63/0892; H04L 63/107; H04L 61/2092; H04L 61/6068; H04B 1/3827; H04B 1/3822; H04W 4/025; H04W 12/06; G08G 1/162; G08G 1/096783; G08G 1/096791
See application file for complete search history.

(56) References Cited

U.S. PATENT DOCUMENTS

| | | | |
|---|---|---|---|
| 6,542,491 B1 | 4/2003 | Tari et al. | |
| 6,922,629 B2* | 7/2005 | Yoshikawa | G08G 1/096716 340/995.13 |
| 7,418,505 B2* | 8/2008 | Lim | H04L 45/00 370/235 |
| 7,433,325 B1* | 10/2008 | Sagy | H04L 43/022 370/254 |
| 7,499,440 B2 | 3/2009 | Nakajima et al. | |
| 7,830,843 B2* | 11/2010 | Baek | H04L 29/12009 370/312 |
| 8,019,802 B2* | 9/2011 | Rose | G06F 7/58 708/254 |
| 8,339,991 B2* | 12/2012 | Biswas | H04L 41/04 370/254 |
| 8,423,758 B2* | 4/2013 | Singhal | H04L 63/1466 713/150 |
| 2003/0135625 A1* | 7/2003 | Fontes | H04L 63/12 709/228 |
| 2004/0093425 A1* | 5/2004 | Thomas | H04L 69/16 709/236 |
| 2005/0018645 A1* | 1/2005 | Mustonen | H04L 29/12311 370/349 |
| 2005/0022020 A1* | 1/2005 | Fremberg | H04L 63/083 726/4 |
| 2005/0041675 A1* | 2/2005 | Trostle | H04L 29/12009 370/401 |
| 2005/0083866 A1* | 4/2005 | Kubotani | G06Q 20/32 370/310 |
| 2005/0175201 A1* | 8/2005 | Herman | G06F 21/31 381/312 |
| 2005/0262218 A1* | 11/2005 | Cox | H04L 61/2015 709/217 |
| 2005/0273505 A1* | 12/2005 | Kim | H04L 29/1232 709/220 |
| 2006/0176847 A1* | 8/2006 | Chen | G08G 1/161 370/328 |
| 2007/0177612 A1* | 8/2007 | Kubota | H04L 29/12264 370/395.52 |
| 2007/0230694 A1* | 10/2007 | Rose | G06F 7/58 380/46 |
| 2008/0008179 A1* | 1/2008 | Chen | H04L 61/2007 370/392 |
| 2008/0307069 A1* | 12/2008 | Froment | H04L 29/12113 709/218 |
| 2009/0051956 A1* | 2/2009 | Kondo | G06F 21/34 358/1.13 |
| 2009/0197620 A1* | 8/2009 | Choi | H04L 29/12792 455/456.3 |
| 2009/0262928 A1* | 10/2009 | Busari | G06F 7/588 380/46 |
| 2010/0120497 A1* | 5/2010 | Weber | G07F 17/32 463/20 |
| 2011/0022916 A1* | 1/2011 | Desai | G06F 1/3203 714/748 |
| 2011/0032870 A1* | 2/2011 | Kumar | H04W 12/12 370/328 |
| 2011/0314167 A1* | 12/2011 | King | H04L 67/14 709/228 |
| 2012/0034876 A1* | 2/2012 | Nakamura | H04L 9/321 455/66.1 |
| 2013/0090132 A1* | 4/2013 | Terada | H04W 4/021 455/456.1 |
| 2013/0176433 A1* | 7/2013 | Terada | G06Q 30/02 348/143 |
| 2013/0243192 A1* | 9/2013 | de Roulet | G06F 7/00 380/46 |
| 2013/0333009 A1* | 12/2013 | Mackler | G06F 21/31 726/7 |
| 2014/0282093 A1* | 9/2014 | Burke | H04W 4/029 715/753 |
| 2015/0215274 A1* | 7/2015 | Imadali | H04L 61/6059 709/245 |
| 2015/0256506 A1* | 9/2015 | Sawato | H04L 51/38 715/758 |
| 2016/0020988 A1* | 1/2016 | Hui | H04L 61/2015 370/254 |
| 2016/0247175 A1* | 8/2016 | Milton | H04W 4/029 |
| 2016/0358432 A1* | 12/2016 | Branscomb | G08B 13/1965 |
| 2017/0230797 A1* | 8/2017 | Lauterbach | H04W 4/046 |

FOREIGN PATENT DOCUMENTS

| | | |
|---|---|---|
| JP | 2007-232727 A | 9/2007 |
| JP | 2011-229184 A | 11/2011 |

OTHER PUBLICATIONS

Extended European Search Report dated Jan. 7, 2016.
Japanese Office Action dated Mar. 6, 2018, with an English translation.

* cited by examiner

| TIME | Area/Date PORTION | INDIVIDUAL ADDRESS |
|------|-------------------|--------------------|
| t1 | rand(HASH(area1, t1, seed)) | 189.076 |
| t2 | rand(HASH(area1, t2, seed)) | 189.076 |
| ... | ... | ... |
| tx | rand(HASH(area1, tx, seed)) | 189.076 |

COMMUNICATION SYSTEM, COMMUNICATION DEVICE, VEHICLE AND COMMUNICATION METHOD

CROSS-REFERENCE TO RELATED APPLICATIONS

The disclosure of Japanese Patent Application No. 2014-173790 filed on Aug. 28, 2014 including the specification, drawings and abstract is incorporated herein by reference in its entirety.

BACKGROUND

The present invention relates to a communication system, a communication device, a vehicle and a communication method and, in particular, relates to the communication system, the communication device, the vehicle and the communication method that are favorably utilized in an on-vehicle communication machine (or an on-vehicle communication equipment), a vehicle that loads the on-vehicle communication machine (or the on-vehicle communication equipment) thereon, a roadside communication machine (or a roadside communication equipment) and so forth that configure an intelligent transport system (ITS).

As a network of vehicles evolves, it becomes unavoidable to connect each vehicle with the outside over a network. Various applications of the network of vehicles are examined and a range of applications of the network of vehicles covers various fields. Therefore, it becomes an important task to prevent illegal access at a gateway that serves as an inlet into a communication path. Therefore, the security of a level that is as high as that of a firewall system and so forth of the type that is performed in a personal computer (PC), related-art IT (Information Technology) system and so forth over Internet is demanded.

In Japanese Unexamined Patent Application Publication No. 2011-229184, there is disclosed a communication system that a network connection service that a host device and a management computer give a dynamic IP (Internet Protocol) address to a communication module provides. It is possible to make it difficult to directly access to a computer that is present on an internal network from the outside by converting the IP address depending on whether it is used on the internal network or an external network.

In Japanese Unexamined Patent Publication No. 2002-176444, there is disclosed a position-information-based communication address allocation method by which it is possible to specify an area of an information transmission source by giving locality to a communication address. When acquiring the IP address, an information processing device sets installation position information of the IP address and an IP address management server generates the IP address that information indicating the area such as a zip code, a telephone number and so forth is included in a predetermined number of bits on the basis of the installation position information and gives the IP address so generated to the information processing device.

SUMMARY

As a result of examination that the inventors and others of the present invention have made on the technologies disclosed in Japanese Unexamined Patent Publication Nos. 2011-229184 and 2002-176444, it was found that there arise new disadvantages as follows.

It was found that it is difficult to implement the security function of the same level as that of the PC by using a function of MCU (Micro Controller Unit) that is loaded on the vehicle and the roadside machine that are terminals of the vehicle network. That is, in a vehicle-to-vehicle and/or road-to-vehicle communication system in the motorized society, resource and machine power of an LSI (Large Scale Integrated circuit) that performs communication processing have limitations, and it was found that it is difficult to introduce the firewall system of the type that is performed in the related-art IT system for the purpose of ensuring security. In addition, since the real time property is asked for in regard to fatal and important applications such as, for example, a brake, a steering and so forth, a communication error and a method of using considerably heavy (complicated and time-consuming) calculations may lead to occurrence of a fatal traffic accident.

The technology described in Japanese Unexamined Patent Publication No. 2011-229184 is based on the assumption that the internal network is protected by site security. When it is tried to apply this technology to the vehicle network, it induces such a situation that many and unspecific entities that mutually perform vehicle-to-vehicle and road-to-vehicle communications are present on the internal network that is protected by site security and it was found that authentication using the IP address becomes substantially difficult. The reason lies in the fact that the IP addresses that the entities that would possibly participate in the network possess spread out to all IP addresses and thus sorting using the IP address becomes difficult.

According to the technology described in Japanese Unexamined Patent Publication No. 2002-176444, since the position information that allows specification of the area is incorporated into the IP address, area-based authentication of vehicles and roadside machines is facilitated. However, it is easy to obtain the position information, this induces such a situation that an opportunity to spoof as the entity is provided to an attacker and therefore it is difficult to ensure security.

As described above, in order to ensure the security in network communication between the vehicles, provision of a high-speed and light-weighted authentication system that does not impair the real time property becomes unavoidable.

Although ways of eliminating such disadvantages as mentioned above will be described in the following, other subjects and novel features will become apparent from description of the present specification and the appended drawings.

According to one embodiment, there is provided a communication system as follows.

That is, according to one embodiment, there is provided the communication system that a plurality of communication devices are coupled together such that mutual communication is possible over a network. The communication system is configured as follows. Communication of the plurality of communication devices with a server is possible under a secure environment, and when authentication is to be given from the server under the secure environment, random seeds of the same value and individual identifiers are issued from the server to the plurality of communication devices. Each of the plurality of communication devices generates an IP address that includes a pseudorandom number generated by using a value generated from area information that the communication device itself possesses and the issued random seed as a seed and the individual identifier that has been issued to the communication device itself. The plurality of communication devices establish communication between the communication devices that include the pseudorandom numbers that are mutually the same in their IP addresses.

Advantageous Effects of the Invention

Advantageous effects obtained by the one embodiment will be briefly described as follows.

That is, even on a network that many and unspecific entities (communication devices) are present, it becomes possible to perform IP address filtering and it is possible to provide the high-speed and light-weighted authentication system that does not impair the real time property.

DETAILED DESCRIPTION

1. Summary of Embodiments

First, typical embodiments disclosed in the present application will be briefly described. In brief description on the typical embodiments, a reference numeral referred to in the drawings by being put into parentheses simply illustrates the one included in the concept of a constitutional element to which the reference numerals has been assigned.

[1] <Communication System>

One typical embodiment disclosed in the present application pertains to a communication system 1 that a plurality of communication devices 10, 11 to 15 are coupled together such that mutual communication is possible over a network 4 and each of the plurality of communication devices is coupled with a server 2 such that communication with the server 2 is possible. The communication system 1 is configured as follows.

When the server 2 has been requested authentication from the plurality of communication devices 10, 11 to 15 under a secure environment 3 and has authenticated the plurality of communication devices 10, 11 to 15, the server 2 issues random seeds 33 of the same value and individual identifiers 32 to the plurality of communication devices 10, 11 to 15. Each of the plurality of communication devices 10, 11 to 15 includes its own area information 34 and includes an IP address 30 that includes a pseudorandom number 31 that has been generated by using the area information 34 and the issued random seed 33 as seeds and the identifier 32 that has been issued to the communication device itself. The plurality of communication devices 10, 11 to 15 establish communication between the communication devices that include the pseudorandom numbers 31 that are mutually the same in their IP addresses 30.

Thereby, it becomes possible to perform filtering of the IP address even on a network that many and unspecific entities (the communication devices) are present and it is possible to provide the high-speed and light-weighted authentication system that does not impair the real time property.

[2] Area Information+Time Information>

In the item 1, each of the plurality of communication devices 10, 11 to 15 also includes time information 35 and the pseudorandom number 31 is generated by using a value that has been generated with an irreversible compressibility function 41 on the basis of the area information 34, the time information 35 and the random seed 33 as a seed.

Thereby, it is possible to perform more accurate and flexible IP address filtering and it is possible to provide the high-speed and light-weighted authentication system that does not impair the real time property.

[3] <GPS>

In the item 2, each of the plurality of communication devices 10, 11 to 15 includes a GPS reception unit 23 and the GPS reception unit 23 generates the area information 34 and the time information 35.

Thereby, it is possible to share the accurate area information 34 and time information 35 among the plurality of communication devices 10, 11 to 15, and it is possible to provide the high-speed and light-weighted authentication system that does not impair the real time property.

[4] <Periodic Change of Random Seed>

In any one of the items 1 to 3, the server 2 periodically reissues random seeds 33 of values that are different from those of the already issued random seeds and are the same as one another to the plurality of communication devices 10, 11 to 15. Each of the plurality of communication devise 10, 11 to 15 updates the IP address 30 on the basis of the reissued random seed 33.

Thereby, it is possible to enhance the security to spoofing.

[5] <ITS>

In anyone of the items 1 to 4, the plurality of communication devices include communication devices 11_1 and 11_2 to be loaded on vehicles and the communication device 12 to be loaded on a roadside machine.

Thereby, it is possible to implement the intelligent transport system (ITS) that includes the high-speed and light-weighted authentication system that does not impair the real time property.

[6] <Participation of Pedestrians and Others in ITS>

In the item 5, the plurality of communication devices include the communication device 13 to be loaded on portable electronic equipment that a pedestrian carries with him/her and/or the communication device 14 to be loaded on a bicycle.

Thereby, it is possible to implement the intelligent transport system (ITS) in which the pedestrian and the bicycle participate.

[7] <Communication Device>

Another typical embodiment disclosed in the present application pertains to each of the communication devices 10, 11 to 15 that communication with the server 2 is possible and communication with other communication devices 10, 11 to 15 is possible over the network 4. Each of the communication devices 10, 11 to 15 is configured as follows.

Each of the communication devices 10, 11 to 15 includes the IP address 30 that includes the pseudorandom number 31 that has been generated by using the value generated with the irreversible compressibility function 41 on the basis of the area information 34 and the random seed 33 that has been issued from the server 2 under the secure environment 3, and authenticates another communication device that includes the IP address 30 that includes the same pseudorandom number as its own IP address 30 as a communication object.

Thereby, it becomes possible to perform IP address filtering even on the network that many and unspecific entities (the communication devices) are present, and it is possible to provide the communication device that includes the high-speed and light-weighted authentication system that does impair the real time property.

[8] <Area Information+Time Information>

In the item 7, each communication device further includes the time information 35 and the pseudorandom number 31 is generated by using the value generated with the irreversible compressibility function 41 on the basis of the area information 34, the time information 35 and the random seed 33 as the seed.

Thereby, it is possible to perform more accurate and flexible IP address filtering.

[9] <GPS>

In the item 8, the communication device includes the GPS reception unit 23 and the GPS reception unit 23 generates the area information 34 and the time information 35.

Thereby, it is possible to share the accurate area information 34 and time information 35 among the plurality of communication devices 10, 11 to 15.

[10] <Periodic Change of Random Seed>

In any one of the items 7 to 9, the random seed 33 is periodically reissued from the server 2 and each communication device updates its own IP address 30 on the basis of the reissued random seed 33.

Thereby, it is possible to enhance the security to spoofing.

[11] <LSI with Communication Function>

In any one of the items 7 to 10, each communication device is formed on a single semiconductor substrate.

Thereby, it is possible to implement the LSI having a high-speed and light-weighted authentication function that does not impair the real time property.

[12] <Vehicle>

The communication device described in any one of the items 7 to 10 is loaded on the vehicle.

[13] <Communication Method>

Further another typical embodiment disclosed in the present application pertains to a communication method in the communication system 1 that the plurality of communication devices 10, 11 to 15 are coupled together such that mutual communication is possible over the network 4 and each of the plurality of communication devices 10, 11 to 15 is coupled with the server 2 such that communication with the server 2 is possible. The communication method is configured by including respective steps as follows.

The communication method includes the first step (S8 and S9) that when the server 2 has been requested authentication under the secure environment 3 from the plurality of communication devices 10, 11 to 15 and has authenticated the plurality of communication devices 10, 11 to 15, the server 2 issues the random seeds 33 of the same value and the individual identifiers 32 to the plurality of communication devices 10, 11 to 15, the second step (S10 and S11) that each of the plurality of communication devices 10, 11 to 15 includes its own area information 34 and generates the IP address 30 that includes the pseudorandom number 31 generated by using the area information 34 and the issued random seed 33 as the seeds and the identifier 32 issued to the communication device itself, and the third step (S12 to S17) that the plurality of communication devices 10, 11 to 15 establish communication between the communication devices that include the pseudorandom numbers 31 that are mutually the same in their IP addresses 30.

Thereby, it becomes possible to perform IP address filtering even on the network that many and unspecific entities (the communication devices) are present, and it is possible to provide the high-speed and light-weighted authentication system that does not impair the real time property.

[14] <Area Information+Time Information>

In the item 13, each of the plurality of communication devices 10, 11 to 15 further includes the time information 35, and in the second step, the pseudorandom number 31 is generated by using the value generated with the irreversible compressibility function 41 on the basis of the area information 34, the time information 35 and the random seed 33 as the seed.

Thereby, it is possible to perform more accurate and flexible IP address filtering and it is possible to provide the high-speed and light-weighted authentication system that does not impair the real time property.

[15] <GPS>

In the item 14, each of the plurality of communication devices 10, 11 to 15 includes the GPS reception unit 23 and the GPS reception unit 23 generates the area information 34 and the time information 35.

Thereby, it is possible to share the accurate area information 34 and time information 35 among the plurality of communication devices 10, 11 to 15 and it is possible to provide the high-speed and light-weighted authentication system that does not impair the real time property.

[16] <Periodic Change of Random Seed>

In any one of the items 13 to 15, the server 2 periodically reissues new random seeds 33 of values that are different from those of the already issued random seeds and are the same as one another to the plurality of communication devices 10, 11 to 15. Each of the plurality of communication device 10, 11 to 15 updates its own IP address 30 on the basis of the reissued random seed 33.

Thereby, it is possible to enhance the security to spoofing.

[17] <ITS>

In any one of the items 13 to 16, the plurality of communication devices include the communication devices 11_1 and 11_2 to be loaded on the vehicles and the communication device 12 to be loaded on the roadside machine.

Thereby, it is possible to implement the intelligent transport system (ITS) that includes the high-speed and light-weighted authentication system that does not impair the real time property.

[8] <Participation of Pedestrians and Others in ITS>

In the item 17, the plurality of communication devices include the communication device 13 to be loaded on the portable electronic equipment that the pedestrian carries with him/her and/or the communication device 14 to be loaded on the bicycle.

Thereby, it is possible to implement the intelligent transport system (ITS) in which the pedestrian and the bicycle participate.

2. Embodiments

Preferred embodiments of the present invention will be described in more detail.

Embodiment 1

Figure 1:
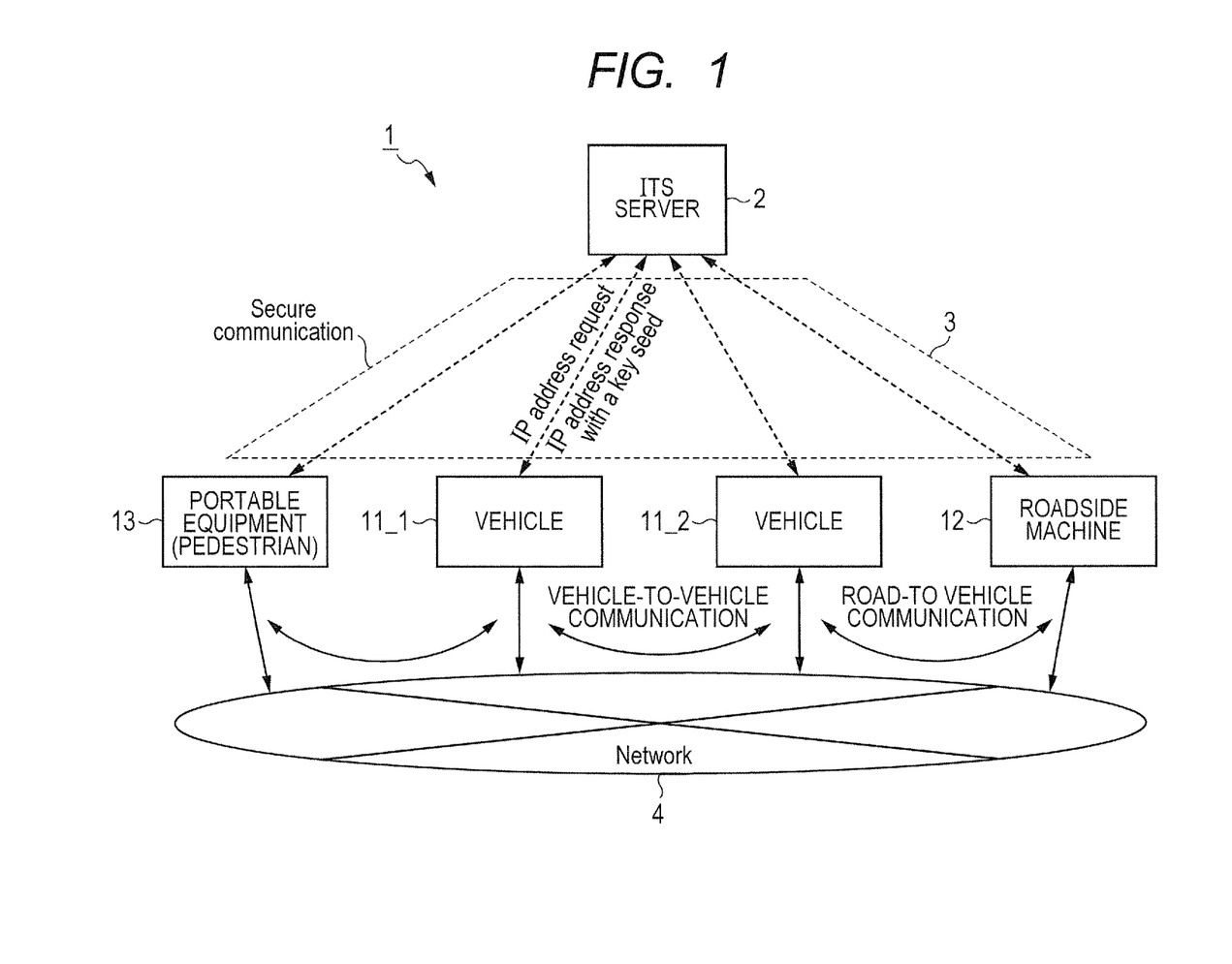
FIG. 1 is a block diagram illustrating one configuration example of a communication system.

FIG. 1 is a block diagram illustrating one configuration example of the communication system 1 according to an embodiment 1. The plurality of communication devices 11_1, 11_2, 12 and 13 that participate in a network service are coupled together such that mutual communication is possible over the network 4. Each of the plurality of communication devices 11_1, 11_2, 12 and 13 is coupled with the ITS server 2 via the secure communication path (the secure environment) 3. The communication system 1 illustrated in FIG. 1 embodies a case where the communication system 1 has been applied to the intelligent transport system (ITS), 11_1 and 11_2 each denotes the communication device to be loaded on the vehicle and correspond to an on-vehicle communication machine (or an on-vehicle communication equipment), 12 denotes the communication device to be loaded on the roadside machine and correspond to a roadside communication machine (or a roadside communication equipment), and 13 denotes the communication device to be loaded on the portable electronic equipment that the pedestrian or another person carries with him/her. There is no limitation on the number of the communication devices that participate in the network service and the kind of the device to which the communication device is to be loaded. The secure communication path 3 may be any of a mobile phone network such as, for example, a 3G network and so forth, a public wireless LAN network and a secure communication network that the ITS server 2 is coupled to the same network 4, communication is established on the network 4 via a roadside machine 12 and the safety is maintained by using a certificate and so forth. The plurality of communication devices 11_1, 11_2, 12 and 13 perform vehicle-to-vehicle and road-to-vehicle communications by using the IP addresses 30 that have been allocated from the ITS server 2. Incidentally, in the specification, 10 is used when indicating the communication device in general and 11 to 15 and so forth are used when distinguishing the communication devices from one another depending on the individual device on which the communication device concerned is to be loaded.

Figure 2:
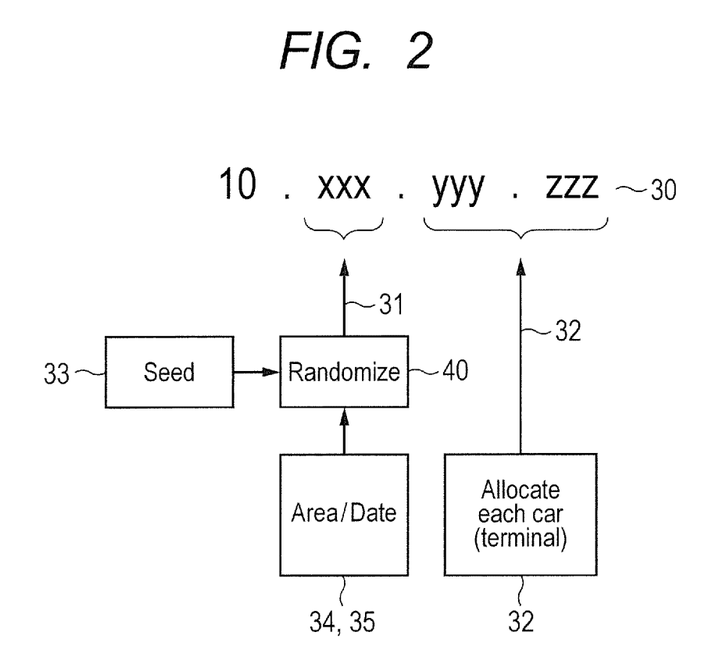
FIG. 2 is an explanatory diagram illustrating one generation example of an IP address (IPv4) in the communication system.

FIG. 2 is an explanatory diagram illustrating one generation example of an IP address (IPv4) used in the communication system 1. Although the address of the class A that is the largest in the number of addresses to be allocated in private addresses of the IPv4 type is given by way of example, an address of another class may be adopted. In a case where the address of another class is to be used, it is possible to implement use of the address of another class, for example, by devising so as to fix each 8-bit value per area. The first 8 bits are fixed as a network address and 8 bits in 24 bits of a host address are fixed as the peculiar address 31 (the pseudorandom number) so as to indicate information generated from the area information 34 and the date-time (the time information) 35. Low-order 16 bits are fixed as the individual address (the identifier) 32 to be allocated to the vehicle, the roadside machine and so forth.

The ITS server 2 is requested authentication from the plurality of communication devices 11_1, 11_2, 12 and 13 via the secure communication path 3 ("IP address request" in FIG. 1). When the ITS server 2 has authenticated the communication devices 11_1, 11_2, 12 and 13 as authentic communication devices, the ITS server 2 issues the random seeds (key seeds) 33 and the individual identifiers 32 to the communication devices concerned ("IP address response" in FIG. 1). The random seed 33 is a seed for generating the later described pseudorandom number 31 and the random seeds 33 of the same value are issued to the communication devices that configure the same vehicle-to-vehicle and road-to-vehicle communication network. The random seeds 33 of the same value are used to generate the peculiar addresses 31 of the same value as described later. Here, the "peculiar" addresses means addresses of the values that are the same as one another in the same network over which the vehicle-to-vehicle and road-to-vehicle communications are permitted and are different from the value of the address used in another network over which communication is not permitted. The peculiar address 31 is generated by a randomize circuit 40 on the basis of the issued random seed 33, the area information 34 and the date-time (the time information) 35. In a case where the same random seed 33, the same area 34 and the same time 35 are obtained, the peculiar addresses 31 have the values that are the same as one another. On the other hand, the individual identifier 32 is the individual address 32 to which the value that is made individually different from other values been allocated in order to distinguish the plurality of communication devices that participate in the vehicle-to-vehicle and road-to-vehicle communication network from one another.

Figure 3:
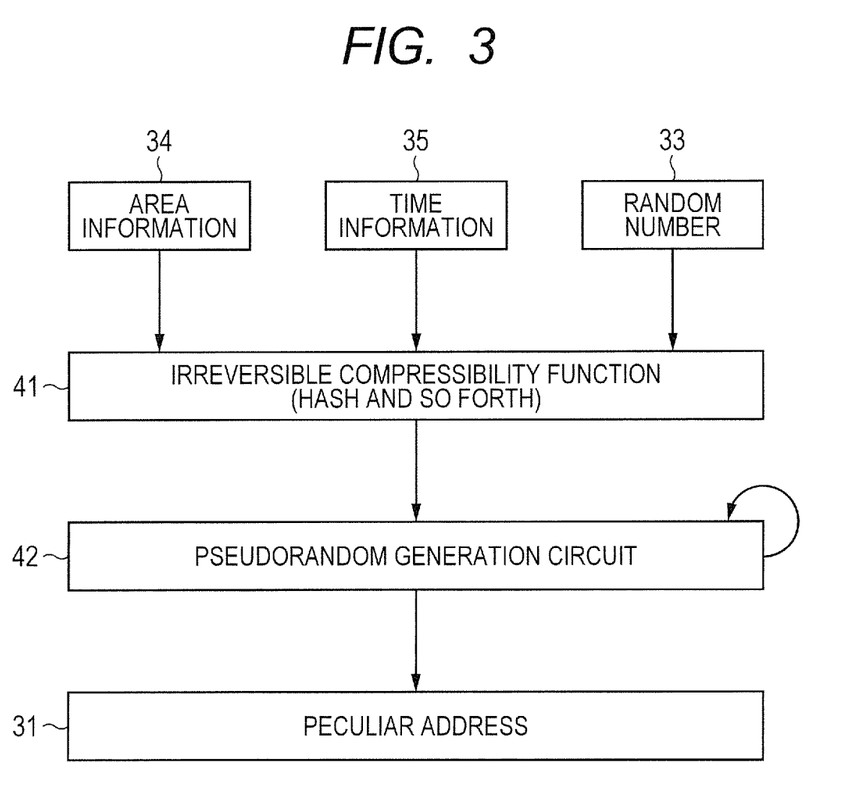
FIG. 3 is an explanatory diagram illustrating one generation example of a peculiar address.

FIG. 3 is an explanatory diagram illustrating one generation example of the peculiar address 31. In order to generate the peculiar address 31, the area information 34, the time information 35 and the random seed 33 are compressed as one piece of information with the irreversible compressibility function 41. In this occasion, as for the order of the area information 34, the time information 35 and the random seed 33 to be compressed, any order causes no disadvantage as long as the order is shared among the entities that enter the system and, likewise, use of respective pieces of information in a mixed-up state causes no disadvantage. The irreversible compressibility function 41 is configured by using, for example, a HASH function though not particularly limited. A pseudorandom number generation circuit 42 generates the random number by using the value generated with the irreversible compressibility function 41 as the seed. The random number so generated is used as the peculiar address 31. It is desirable to share also the irreversible compressibility function and a randomization method among the entities that enter the system.

If the area information 34, the time information 35 and the random seed 33 are shared among the entities (the communication devices), it will become possible to share the address information 31 that is made peculiar commonly in the same system such as the same network and so forth over which the vehicle-to-vehicle and road-to-vehicle communications are permitted when pieces of the area information 34 mutually match and also pieces of the time information 35 mutually match in a state where the random seed 33 is shared among the entities (the communication devices). Accordingly, it becomes possible to confirm whether the entities are the authentic entities (the authentic communication devices) by confirming the peculiar portion (address) 31 in each IP address 30 and it becomes possible to implement a high-speed and light-weighted firewall system.

Thereby, it becomes possible to perform IP address filtering even on the network that many and unspecific entities (the communication devices) are present and it is possible to provide the high-speed and light-weighted authentication system that does not impair the real time property. On the ITS network, there exist many and unspecific entities to be authenticated to participate in the network when the entities happen to be present in the area concerned at the time concerned. The reason lies in the fact that, for example, when a certain auto manufacturer provides the network service to the users of the vehicles manufactured by that auto manufacturer, all vehicles that the auto manufacturer ships are authenticated as the authentic entities. In the vehicle-to-vehicle communication, in reality, it is considerably difficult to execute authentication that collation with a list that includes all of the entities is performed. The communication system according to the present embodiment is configured such that, in the many and unspecific entities, the entity that is present together with the entity concerned itself in the same area at the same time has the peculiar address 31 of the same value as the peculiar address 31 that the entity concerned itself has. Therefore, it is possible to light-weight the authentication by performing the IP address filtering targeting on that peculiar address 31 and, as a result, it is possible to attain rapidity that does not impair the real time property.

Figure 4:
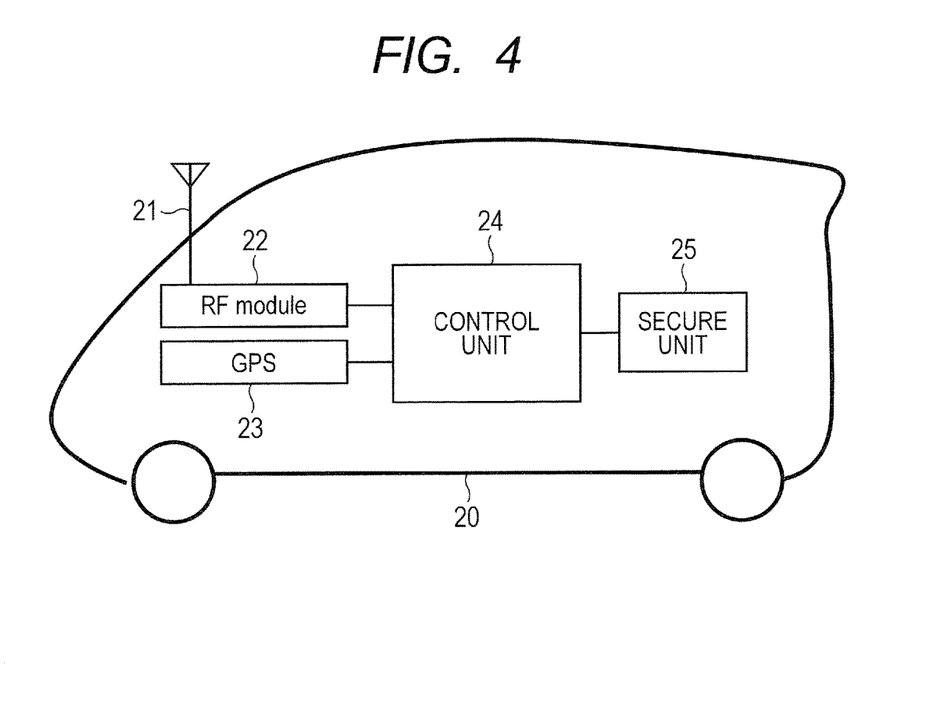
FIG. 4 is an explanatory diagram illustrating one configuration example of a communication device to be loaded on a vehicle.

FIG. 4 is a block diagram illustrating one configuration example of the communication device 11 to be loaded on a vehicle 20. The vehicle 20 includes an antenna 21 and control unit 24 to which a radio frequency module (RF module) 22, a GPS receiver 23 and a secure unit 25 are coupled as the communication device 11.

The RF module 22 receives information sent from other communication devices (another vehicle 11, the roadside machine 12 and so forth) and the ITS server 2 and sends the received information to the control unit 24. A process of demodulating a RF (radio frequency) signal may be performed in any of the RF module 22 and the control unit 24. It is also possible to perform this process in another unit as a matter of course. The GPS receiver 23 sends the time information 35 and the position (area) information 34 to the control unit 24 on the basis of information acquired from a satellite. In this occasion, the information acquired from the satellite may be decoded in the GPS receiver 23 and/or may be decoded by the control unit 24. Although an example that the GPS function is utilized in acquisition of the time information 35 is illustrated, the time information 35 may be acquired over the network 4. The secure unit 25 includes a function of generating the random number used to generate the IP address 30, a function of calculating the irreversible compressibility function 41 and a pseudorandom generation function. Although the secure unit 25 may function in the control unit 24, the secure unit 25 is illustrated as a separate unit for the convenience of description in the example in FIG. 4. It is possible to implement the constitutional elements 22 to 25 as a single device and/or in the form that some of them are combined together when these elements 22 to 25 have the same function.

It is preferable to configure the value of the peculiar address 31 in the IP address 30 so as to be regularly and/or periodically changed. Regular and/or periodic change of the peculiar address 31 serves as a countermeasure against a so-called spoofing attack that an attacker illegally acquires the authentic IP address by tapping the authentic communication and so forth and performs communication by using the illegally acquired IP address. In regard to the frequency at which the address is changed, it is desirable to change the address at time intervals of about five seconds when estimating from the time taken for attacking. It goes without saying that the higher the frequency is, the more the security is improved when it is allowed to increase the load on the system.

Figure 5:
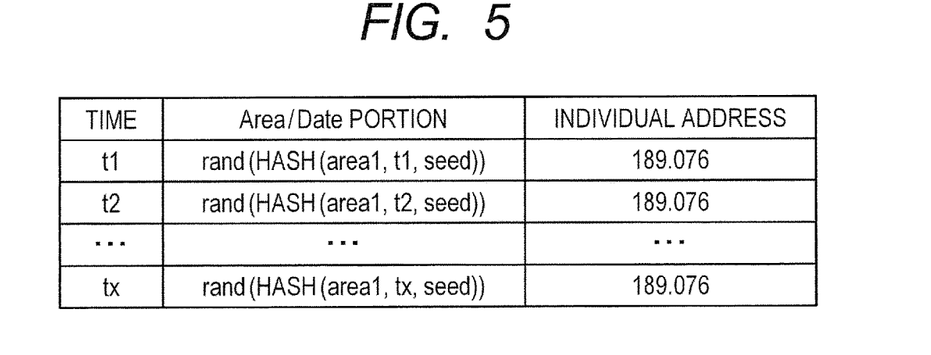
FIG. 5 is an explanatory diagram illustrating one example of periodic updating of the peculiar address.

FIG. 5 is an explanatory diagram illustrating one example of periodic updating of the peculiar address 31. "Area/Date portion" that is the peculiar address 31 and the individual address (identifier) 32 that is the allocated address are indicated at certain time intervals. At a time t1, the area information 34 is indicated as "area1", the time information 35 is indicated as "t1" and the random number 33 issued from the ITS server 2 is indicated as "seed". A pseudorandom number "rand(HASH) (area1,t2,seed))" is generated by using a value "HASH (area1,t2,seed)" obtained by performing irreversible compression on the area information 34, the time information 35 and the random number 33 with the HASH function as the seed and is set as the peculiar address 31. At this time, the individual address 31 allocated from the ITS server 2 is "189.076". At a time t2, although the time information 35 is changed to "t2" and the value of the peculiar address 31 is changed to "rand(HASH(area1,t2, seed))" accordingly, the individual address 32 is still "189.076" with no change. Then, at a time tx, although the time information 35 is changed to "tx" and the value of the peculiar address 31 is changed to "rand(HASH(area1,tx, seed))" accordingly, the address 32 is still "189.076" with no change.

Figure 6:
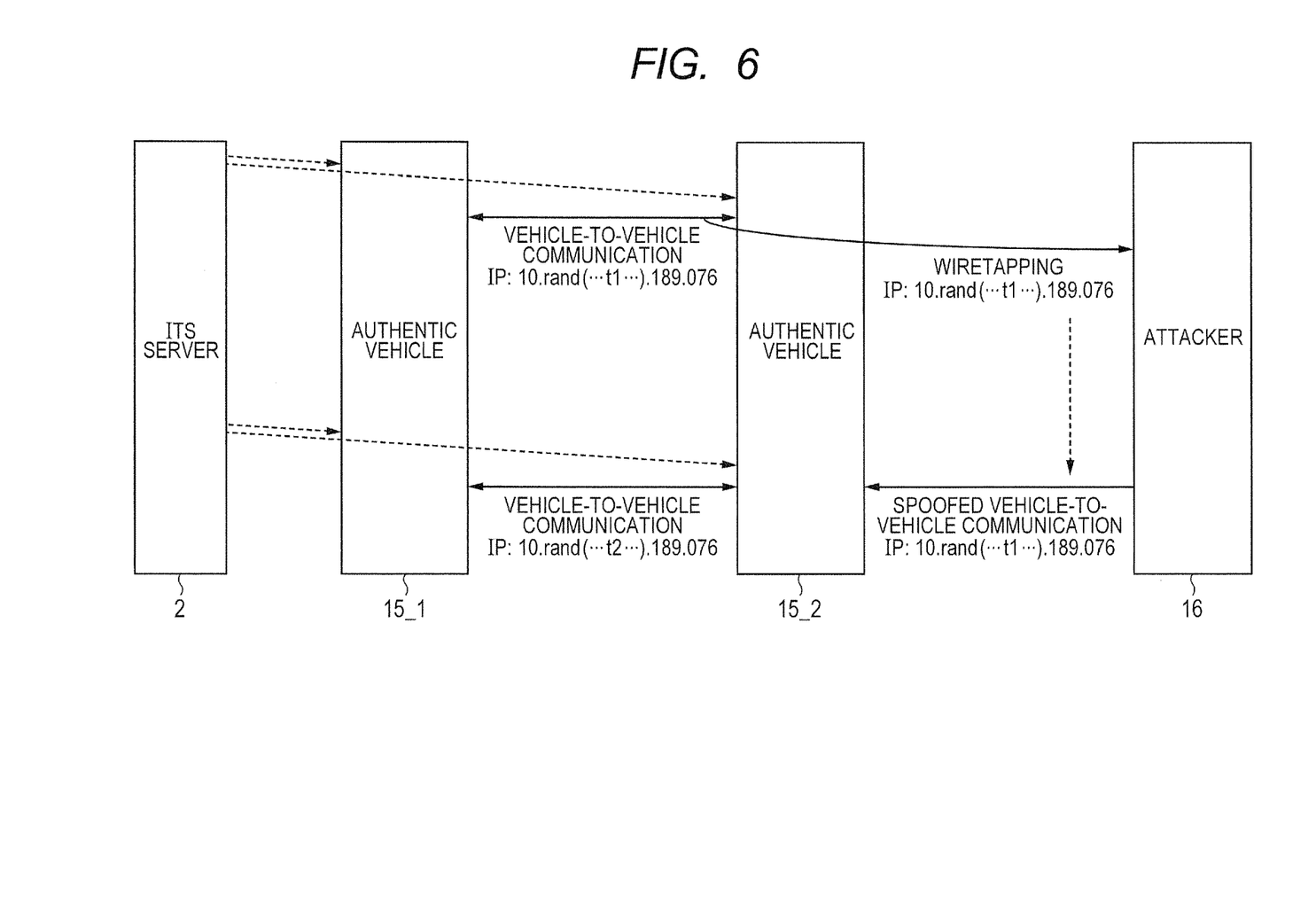
FIG. 6 is an explanatory diagram illustrating one example of resistance to spoofing.

FIG. 6 is an explanatory diagram illustrating one example of resistance to spoofing in the communication system 1. Communication among the ITS server 2, vehicles 15_1 and 15_2 that are the authentic communication devices and a communication device 16 that is the attacker is schematically illustrated on the assumption that the time passes downward in the drawing. The authentic vehicles 15_1 and 15_2 are authenticated by the ITS server 2 as respectively illustrated by dashed arrows and generate and hold their IP addresses 30. The IP address 30 of the authentic vehicle 15_1 at the time t1 is "10.rand( . . . , t1, . . . ).189.076" and the authentic vehicles 15_1 and 15_2 perform vehicle-to-vehicle communication by using this IP address 30. The attacker 16 taps the vehicle-to-vehicle communication and illegally acquires the IP address 30 "10.rand( . . . , t1, . . . ).189.076". The attacker 16 spoofs as the authentic vehicle 15_1 at the later time t2 by using the illegally acquired IP address 30 "10.rand( . . . , t1, . . . ).189.076" and tries to perform the vehicle-to-vehicle communication with the vehicle 15_2. This is spoofed vehicle-to-vehicle communication. However, at that point of time, the IP address 30 of the vehicle 15-1 has already been changed to "10.rand( . . . , t2, . . . ).189.076". The dashed arrows directed from the ITS server 2 respectively to the authentic vehicles 15_1 and 15_2 are illustrated in FIG. 6. Although FIG. 6 illustrates an example that the time information 35 is given from the ITS server 2 to the vehicle concerned, as described with reference to FIG. 4, each of the vehicles 15_1 and 15_2 may regenerate the peculiar address 31 on the basis of the time information 35 given from the GPS receiver 23 that the vehicle 20 itself includes and then may update the IP address 30. Since also in the IP address 30 of the vehicle 15_2 that is the authentic mate in the vehicle-to-vehicle communication, the portion corresponding to the peculiar address 31 is changed to the same value "rand( . . . , t2, . . . ), the vehicle 15-2 may authenticate the communication device that has the same peculiar address as the vehicle 15-2 itself and may communicate with that communication device. Since in the spoofed vehicle-to-vehicle communication using the IP address 30 "10.rand( . . . , t1, . . . ).189.076" that has been illegally acquired at the older time, the value of the portion corresponding to the peculiar address 31 is different from that in the newly acquired IP address 30, the spoofed communication is excluded as unauthorized access. As described above, it becomes possible to prevent spoofing that the attacker taps the IP address and spoofs as the authentic mate. It is possible to optionally set the IP address changing period depending on the system. It goes without saying that the shorter the changing period is, the more the security is improved. However, the higher the IP address changing frequency is, the more the load on the system is increased. When actually making use of the system, it is desirable to set the changing period of the IP address 30 to about one second to about ten seconds. On the other hand, when the operation of the vehicles is considered, address changing in starting the engine and so forth may be adopted.

Figure 7:
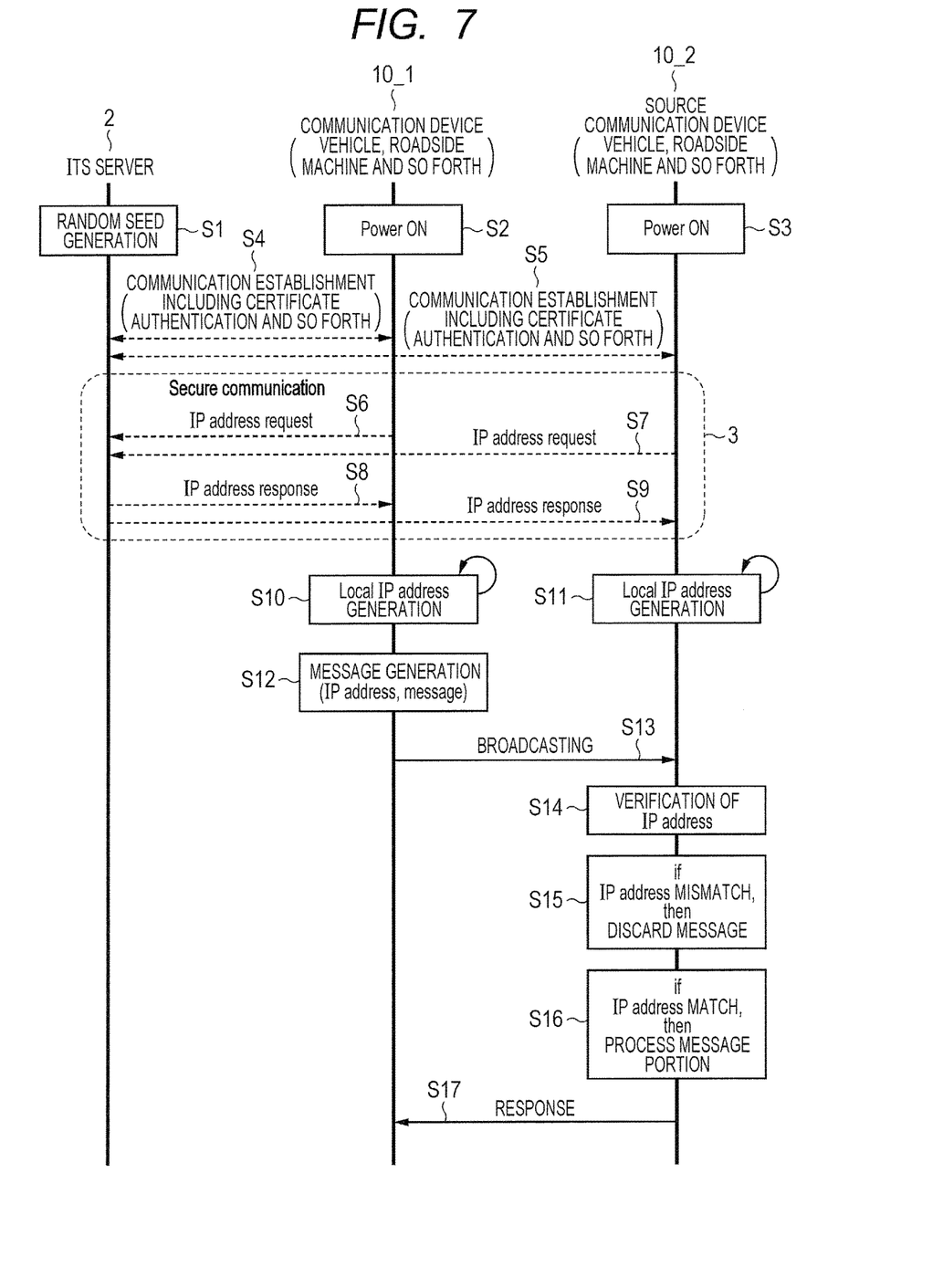
FIG. 7 is a flow chart illustrating one example of a flow of generating a local IP address.

FIG. 7 is a flow chart illustrating one example of a flow of generating a local IP address. A replacement method for information pertaining to generation of the address 31 to be made peculiar is schematically illustrated on the assumption that time passes downward in the drawing. In the ITS server 2, the value to be used as the pseudorandom seed for generating the peculiar address 31 is generated in advance (S1). Then, communication devices 10_1 and 10_2 such as the vehicles and so forth are powered on as occasion calls (S2 and S3). The ITS server 2 operates 24 hours a day in many cases and hence at least there is no such a situation that the ITS server 2 is started in linkage with power-on of the vehicles. Therefore, the value to be used as the pseudorandom seed is generated in advance. Although, as a matter of course, a state where the communication devices 10_1 and 10_2 such as, for example, the vehicles and so forth are powered on and put on standby while provision of the service is being interrupted due to system maintenance and so forth is also conceivable, it is possible to operate the system with no disadvantage by starting the service after the random seed has been prepared even in such a case. In the present embodiment, description will be made not using the above-mentioned peculiar case but using a case where the communication devices 10_1 and 10_2 such as the vehicles and so forth are powered on when the ITS server 2 performs normal operation.

After the communication devices have been powered on (S2 and S3), the communication devices 10_1 and 10_2 such as, for example, the vehicles (the roadside machines) and so forth and the ITS server 2 perform authentication of each of the communication devices 10_1 and 10_2 from both of the ITS server 2 side and the communication device side or from the ITS server 2 side, by a general authentication method using the certificate and so forth (S4 and S5). Safety communication is performed by using session keys and so forth to be exchanged in authentication. On the vehicle 10_1 and 10_2 sides, "IP Address Request" (S6 and S7) is performed under the secure communication environment 3 that has been established by this authentication. Since the vehicles 10_1 and 10_2 are authenticated vehicles, the ITS server 2 immediately sends "IP Address Response" to the vehicles 10_1 and 10_2 (S8 and S9).

Figure 8:
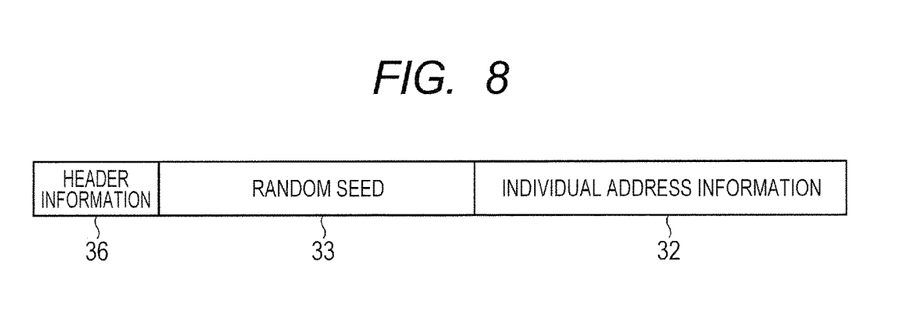
FIG. 8 is an explanatory diagram illustrating one configuration example of a communication packet for IP address response.

FIG. 8 is an explanatory diagram illustrating one configuration example of a communication packet used in "IP Address Response" (S8 and S9). This message includes header information 36, the random seed portion 33 and the individual address portion 32 that has been allocated to each communication device. The header information 36 is a header that is defined by a communication protocol under the secure communication environment 3. Since it is possible to adopt various well-known communication protocols under the secure communication environment 3 as mentioned above, detailed description thereof is omitted.

Description will be made by returning to FIG. 7.

Each of the vehicles 10_1 and 10_2 extracts a pseudorandom seed portion from the received IP address response (S8 and S9) and generates the peculiar address portion 31 (S10 and S11). In addition, each vehicle combines the remaining IP address portion 32 that has been allocated from the ITS server 2 with the peculiar address portion 31 to generate its own local IP address 30.

When performing the vehicle-to-vehicle or road-to-vehicle communication is to be performed, the vehicle 10_1 generates a message that includes the local IP address 30 (S12) and sends the generated message to the mate side 10_2 (S13). In this occasion, the message may be sent by specifying the mate and/or may be sent to a plurality of mates by broadcasting. In the example in FIG. 7, the message is sent by broadcasting (S13). The vehicle or roadside machine 10_2 that has received the message performs verification of the IP address 30 (S14) and confirms whether the peculiar address 31 in the message matches the peculiar address 31 that the vehicle or roadside machine 10-2 itself generates. In a case where the addresses 31 mutually match, the vehicle or roadside machine 10-2 regards the mate as the authentic mate, performs processing of the message portion (S15) and responds to the message as necessary (S17). In a case where the addresses 31 do not mutually match, the vehicle or roadside machine (the communication device) 10-2 decides that the message is illegal and discards the message (S16). In a case where the message has been decided to be illegal, a notification that the message is illegal may be made to the mate from which the message has been sent, in place of discard of the message (S16). In addition, it is also effective for the vehicle that has received the illegal message to inform the ITS server 2 and so forth of reception of the illegal message. Thereby, the security of the system is more improved.

Figure 9:
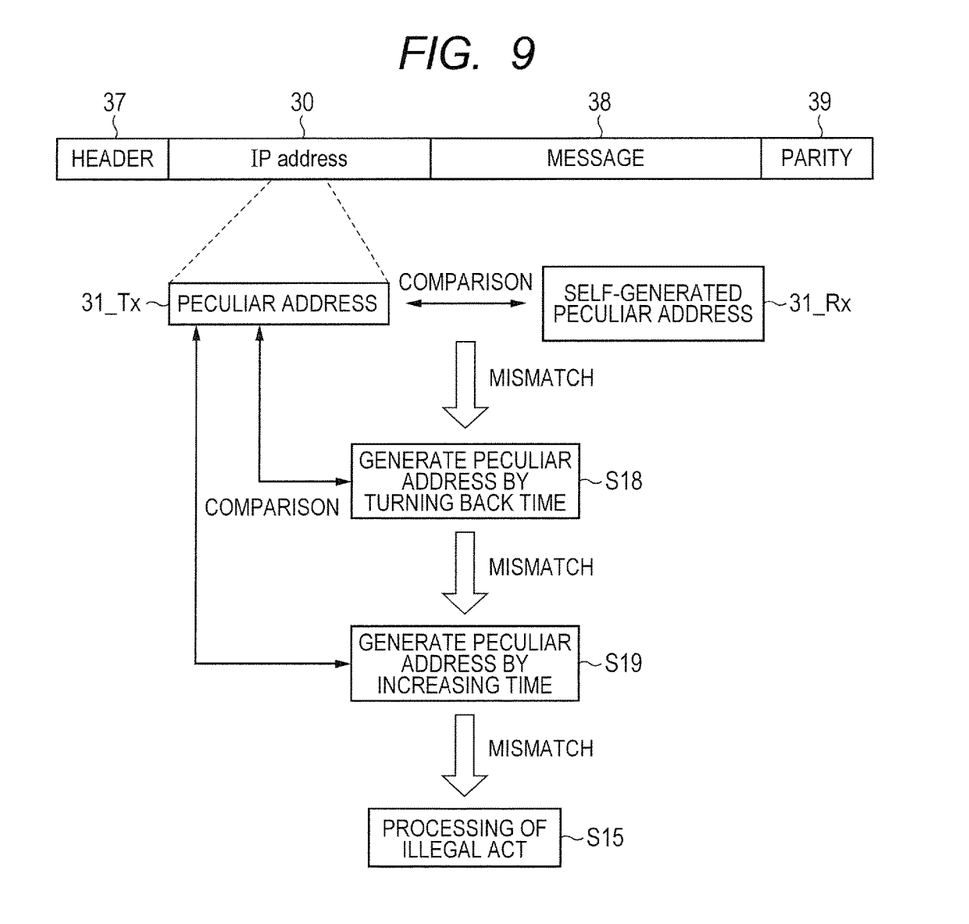
FIG. 9 is an explanatory diagram illustrating one example of an operation of IP address filtering.

FIG. 9 is an explanatory diagram illustrating one example of an operation of IP address filtering. In verification of the IP address (S14) in FIG. 7, an address 31_Tx to be made peculiar is extracted from the IP address 30 of the source that is appended to the received message and whether the address 31_Tx matches a peculiar address 31_Rx that the communication device 10_2 itself generates is confirmed.

At the top of FIG. 9, the packet that is to be transmitted in "Broadcasting" (S13) illustrated in FIG. 7 is illustrated. The packet is configured by a header 37, the IP address 30 of the source, a message 38 and parity 39. The IP address 30 of the source includes the peculiar address 31_Tx. The communication device 10_2 that has received the packet extracts the peculiar address 31_Tx from the packet and compares the peculiar address 31_Tx with the peculiar address 31_Rx that the communication device 10_2 itself generates. Although in a case where these addresses do not mutually match, the process may be immediately shifted to dishonest act processing (S15), before deciding to be illegal, a method of performing verification by comparing the address 31_Tx with each of peculiar addresses that haven been generated by delaying and advancing the time, and discarding the message when the addresses still do not mutually match may be adopted, considering out-of-synchronization of times. That is, a peculiar address 31-Rx (−1) is generated by putting the value of the time back to the value obtained before the latest updating and is compared with the received peculiar address 31_Tx (S18). Further, a peculiar address 31_Rx (+1) is generated by increasing the value of the time to the next updated value and is compared with the received peculiar address 31_Tx (S19). When the addresses do not mutually match in both cases, the process is shifted to the dishonest act processing (S15). It becomes possible to safely share the seed portion 31 to be made peculiar in the IP address 30 by following such procedures even in a case where out-of-synchronization of times occurs between the communication devices.

Figure 10:
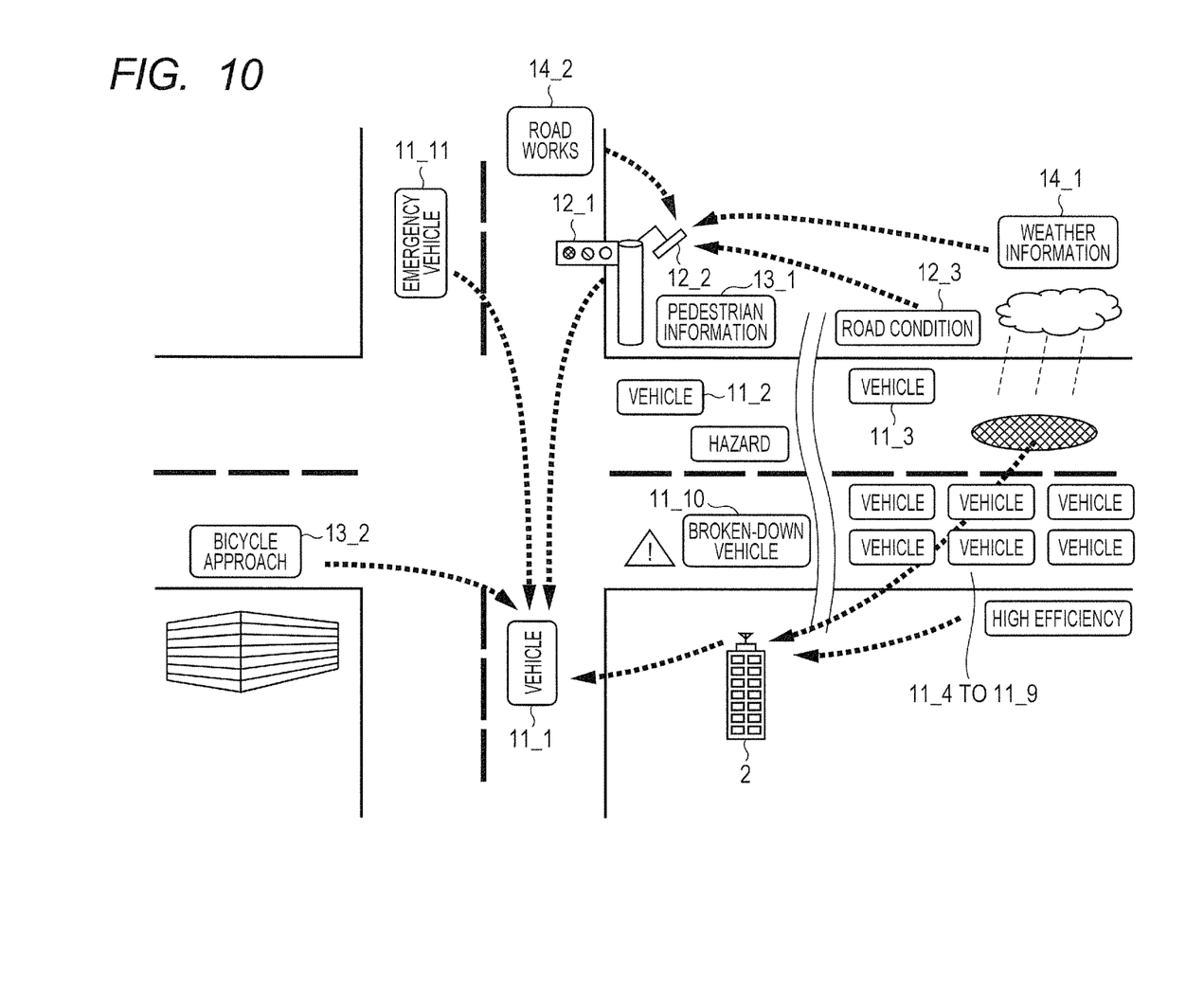
FIG. 10 is a schematic diagram illustrating one application example of the communication system to the intelligent transport system (ITS).

FIG. 10 is a schematic diagram illustrating one application example of the communication system 1 to the intelligent transport system (ITS). Although, in the above-mentioned embodiment, the vehicle 11 and the roadside machine 12 have been mainly described as the communication device 10 and the vehicle-to-vehicle and road-to-vehicle communications have been mainly described as the communication between the communication devices, the communication device 10 may be further included in various forms and the communication between the communication devices may be also further included in various forms even just limited to the intelligent transport system (ITS).

As the communication device 10, various vehicles such as, for example, normally running vehicles 11_1 to 11_3, vehicles 11_4 to 11_9 that have gotten caught in traffic, a broken-down vehicle 11_10, an emergency vehicle 11_11 and so forth are included, and as the roadside machines, a signal 12_1, a traffic sign 12_2, a traffic condition monitor 12_3 and so forth are included. As the communication device 10, portable equipment 13_1 such as, for example, a smartphone and so forth that the pedestrian carries with him/her, portable equipment 13_2 that is attached to a bicycle or is carried by a driver, a weather monitor 14_1 that collects and notifies weather information, a traffic control support device 14_2 that transmits information on road works and so forth may be included. These communication devices mutually perform communication in optional forms in addition to the vehicle-to-vehicle and road-to-vehicle communications. The ITS server 2 may be also configured to directly participate in the same network 4 and/or may be installed as one kind of the roadside machine to be used as a base station for authentication.

Embodiment 2

Although in the embodiment 1, a case where the IP address is of the IPv4 type has been described, an IPv6-type IP address may be configured similarly to the IPv4-type IP address.

Figure 11:
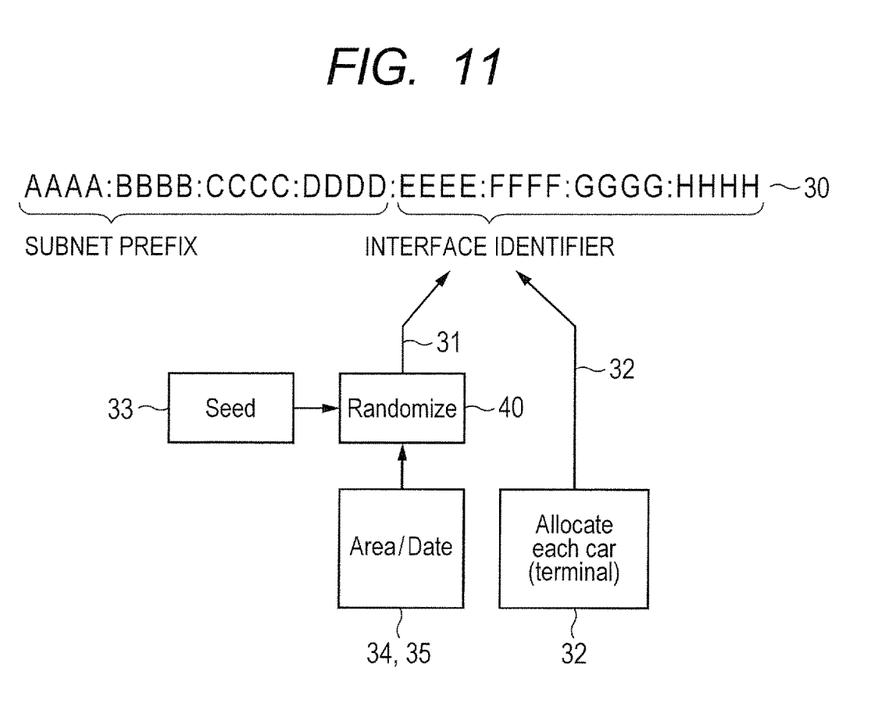
FIG. 11 is an explanatory diagram illustrating one generation example of an IP address (IPv6) in the communication system.

FIG. 11 is an explanatory diagram illustrating one generation example of the IP address (IPv6) in the communication system. The IPv6 IP address is configured by eight blocks in units of 16 bits and it is possible to use an optional value for a 64-bit interface identifier as defined in RFC4193. In the 64-bit interface identifier, the peculiar address 31 and the individual address 32 are allocated as in the case in FIG. 2. That is, the peculiar address 31 is generated from the issued random seed 33, the area information 34 and the date-time information 35 by the randomize circuit 40, and each value that is made individually different from other values is allocated to each individual address 32 in order to distinguish the plurality of communication devices that participate in the vehicle-to-vehicle and road-to-vehicle communication network from one another. In the IPv6 address, since the degree of freedom of bits is high, it is also possible to change the positions of bits into which the peculiar address 31 is to be put and it is also possible to change a length of bits to be made peculiar. However, since the longer the length of peculiar bits becomes, the more the number of objects to which the individual addresses 32 are allocated is reduced, it is unavoidable to take care. It is desirable to set the length of bits to be allocated as the individual address 32 to about 16 or more bits.

Although, in the foregoing, the invention made by the inventors and others of the present invention has been specifically described on the basis of the preferred embodiments, it goes without saying that the present invention is not limited to the aforementioned embodiments and may be modified in a variety of ways within the scope not deviating from the gist of the present invention.

It is possible to modify the communication system 1 according to the embodiment of the present invention in various forms for a communication system configured to provide some communication devices that are limited by the area information in many and unspecific communication devices with the network service in the area concerned, not limited to the intelligent transport system (ITS) that includes the vehicles and the roadside machines. For example, in preparation for a situation that many and unspecific smartphones that establish accounts with a mobile phone company are used as communication equipment and the users enter a shopping mall, carrying the smartphones with them, it is possible to modify and apply the system to the network service that is provided in the shopping mall concerned.

What is claimed is:

1. A communication system comprising:
a plurality of communication devices coupled together such that a mutual communication between the communication devices is possible over a network; and
a server coupled to each of the communication devices such that each communication device selectively communicates with the server using a secure communication path as a secure environment,
wherein the communication devices request an authentication from the server using the secure environment,
wherein the server, upon authenticating the communication devices, issues to the communication devices random seeds of a same value and individual identifiers for each authenticated communication device,
wherein each of the communication devices stores its own area information and an IP address that includes a pseudorandom number that has been generated by using the communication device's own area information and the issued random seed as seeds and the individual identifier that has been issued to that communication device,
wherein each of the communication devices further accesses time information, and the pseudorandom number is generated by using a value that has been generated with an irreversible compressibility function on a basis of the area information, the time information, and the issued random seed, the area information and the time information being different from the issued random seed,
wherein the communication devices establish a mutual communication between communication devices having pseudorandom numbers in their IP addresses that are mutually the same, and
wherein the communication devices share the irreversible compressibility function in each of the communication devices to generate the value.

2. The communication system according to claim 1, wherein each of the communication devices includes a GPS reception unit and the GPS reception unit generates the area information and the time information.

3. The communication system according to claim 1, wherein the server periodically reissues to the communication devices random seeds of values that are different from values of already-issued random seeds, wherein a same reissued random seed is sent to each of the communication devices, and each of the communication devices updates its IP address on a basis of the reissued random seed.

4. The communication system according to claim 1, wherein the plurality of communication devices comprise at least one of a communication device configured to be loaded on a vehicle and a communication device configured to be loaded on a roadside machine.

5. The communication system according to claim 4, wherein the communication devices comprise at least one communication device configured to be loaded on portable electronic equipment that a pedestrian carries with him/her and/or a communication device configured to be mounted on a bicycle.

6. The communication system according to claim 1, wherein the communication devices further each comprises the pseudorandom number generation circuit to generate the pseudorandom numbers in their IP addresses that are mutually the same, as a verification.

7. The communication system according to claim 1,
wherein the communication devices comprise a first communication device and a second communication device,
wherein the first communication device generates a first IP address including a first pseudorandom number as the IP address that includes the pseudorandom number,
wherein the second communication device generates a second IP address including a second pseudorandom number as the IP address that includes the pseudorandom number,
wherein the first communication device generates a message including the first IP address and sends the message to the second communication device when performing the mutual communication between the first communication device and the second communication device, and
wherein the second communication device receiving the message performs a verification of the first IP address included in the message and confirms whether the first pseudorandom number included in the message matches the second pseudorandom number in the second IP address generated by the second communication device.

8. The communication system according to claim 7,
wherein the second communication device performs a processing of the message and responds to the message as necessary when the first pseudorandom number and the second pseudorandom number mutually match, and
wherein the second communication device decides that the message is an illegal message and discards the message when the first pseudorandom number and the second pseudorandom number do not mutually match.

9. The communication system according to claim 8, wherein the second communication device informs the server of receiving the illegal message.

10. A communication device comprising an RF module for communicating with a server and for communicating with other communication devices over a network,
wherein the communication device stores an IP address that includes a pseudorandom number that has been generated by using a value generated with an irreversible compressibility function on a basis of area information and a random seed that has been issued from the server under a secure environment as a seed,
wherein the communication device further accesses time information,
wherein the pseudorandom number is generated by using a value generated with the irreversible compressibility function on a basis of the area information, the time information, and the random seed, the area information and the time information being different from the issued random seed,
wherein the communication device authenticates, as a communication object, another communication device that includes an IP address including a same pseudorandom number as its IP address, and
wherein the communication devices share the irreversible compressibility function in each of the communication devices to generate the value.

11. The communication device according to claim 10, further comprising: a GPS reception unit, wherein the GPS reception unit generates the area information and the time information.

12. The communication device according to claim 10, wherein the random seed is periodically reissued from the server and the IP address is updated on the basis of the reissued random seed.

13. The communication device according to claim 10, wherein the communication device is formed on a single semiconductor substrate.

14. A vehicle configured to mount therein the communication device according to claim 10.

15. A communication method in a communication system in which a plurality of communication devices is coupled together such that a mutual communication is possible over a network and each of the communication devices is coupled with a server such that communication with the server is possible, the communication method comprising:
receiving an authentication request by the server from one or more of the communication devices under a secure environment;
authenticating, by the server, the one or more communication devices;
issuing, by the server, to individual ones of the one or more authenticated communication devices pseudo seeds having a same value, each of the communication devices having its own area information; and
generating, in each of the one or more authenticated communication devices, an IP address that includes a pseudorandom number generated by using a value generated with an irreversible compressibility function on a basis of the area information, time information, and the random seed as the seeds issued by the server and an identifier that has been issued to the communication device itself;
establishing, by the one or more authenticated communication devices, a mutual communication between the communication devices having same pseudorandom numbers in their IP addresses; and
sharing, in each of the one or more authenticated communication devices, an irreversible compressibility function to generate the value.

16. The communication method according to claim 15, wherein each of the communication devices includes a GPS reception unit and the GPS reception unit generates the area information and the time information.

17. The communication method according to claim 15, wherein the server periodically issues to the authenticated communication devices random seeds of values that are different from values of already-issued random seeds and are the same as one another and each of the communication devices updates its IP address on a basis of the reissued random seed.

18. The communication method according to claim 15, wherein the plurality of communication devices comprises at least one communication device configured to be loaded on a vehicle and a communication device configured to be loaded on a roadside machine.

19. The communication method according to claim 18, wherein the plurality of communication devices comprises at least one communication device configured to be loaded on portable electronic equipment that a pedestrian carries with him/her and/or a communication device configured to be mounted on a bicycle.

* * * * *